United States Patent Office 3,501,452
Patented Mar. 17, 1970

3,501,452
REACTIVE MONOCHLOROTRIAZINE AZO DYE-STUFFS CONTAINING A SODIUM SALT OF AN ANILINE-N-OMEGA-METHANE SULFONIC ACID GROUP
Mario Bertin and Ugo Moiso, Cesano Maderno, Milan, and Giulio Craia, Saronno, Milan, Italy, assignors to Aziende Colori Nazionali Affini ACNA S.p.A., Milan, Italy, a corporation of Italy
No Drawing. Filed Aug. 24, 1967, Ser. No. 662,871
Claims priority, application Italy, Aug. 29, 1966, 19,701/66
Int. Cl. C09b 62/44; C07d 55/12; D06p
U.S. Cl. 260—146                8 Claims

ABSTRACT OF THE DISCLOSURE

Reactive dyestuff having the formula:

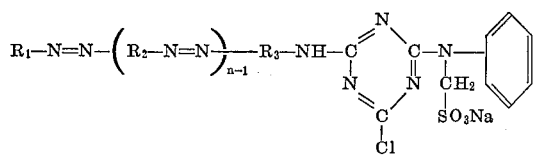

wherein $R_1$, $R_2$ and $R_3$ are each selected from the group consisting of benzene and naphthalene radicals containing substituents selected from the group consisting of —OH, —SO$_3$H, —NO$_2$, halogen radicals, alkyl radicals containing about 1–3 carbon atoms and alkoxy radicals containing about 1–3 carbon atoms and $n$ is 1 or 2, said dyestuff containing at least three —SO$_3$H radicals and which are suitable for dyeing wool, silk, superpolyamides and polyhydroxylated fibers with purity and brightness of shade and good fastness to wet treatments and to chlorine treatment.

BACKGROUND OF THE INVENTION

Field of the invention

The present invention relates to reactive monochlorotriazine azo dyestuffs which are capable of forming chemical bonds with various fibers to thereby produce fast dyeings.

Description of the prior art

In U.S. patent application Ser. No. 462,072, filed on June 7, 1965, and now U.S. Patent No. 3,413,077 there are described monochlorotriazine dyestuffs capable of establishing a chemical bond with textile fibers, these dyestuffs having the general formula:

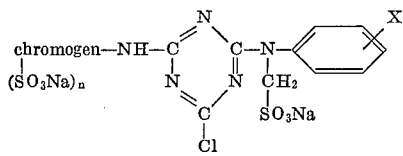

wherein X is —H, —CH$_3$, —OCH$_3$ or —OC$_2$H$_5$; $n$ is 1–4; and the term "chromogen" represents a residue of a dyestuff selected from the group consisting of non-metallized azo dyestuffs, metallized azo dyestuffs, anthraquinone dyestuffs and phthalocyanine. These dyestuffs have in common the structural characteristic of having a substituted or unsubstituted phenyl-amino-N-omega-methane sulfonic acid radical bonded to a carbon atom of the triazine nucleus.

SUMMARY OF THE INVENTION

We have now found a group of new dyestuffs, optionally in the form of chromium and cobalt metallized azo dyestuffs, having the formula:

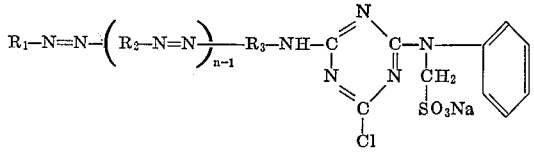

wherein $R_1$, $R_2$ and $R_3$ are each selected from the group consisting of benzene and naphthalene radicals containing substituents selected from the group consisting of —OH, —SO$_3$H, —NO$_2$, halogen radicals, alkyl radicals containing about 1–3 carbon atoms and alkoxy radicals containing about 1–3 carbon atoms, and $n$ is 1 or 2, said dyestuff containing at least 3 —SO$_3$H radicals. These dyestuffs have the important property of being capable of being equally well applied by either the exhaustion or the impregnation dyeing processes or in printing.

DESCRIPTION OF THE PREFERRED EMBODIMENTS

The dyeings which are obtained by using the dyestuffs of the present invention are distinguished by the purity and brightness of the shades, and by very good fastness to wet tests and to treatments in which chlorine is present or is generated.

The dyestuffs of the present invention may be prepared by condensation of cyanuric chloride with the sodium salt of aniline-N-omega-methane-sulfonic acid (condensed product A) and successive reaction of the thus obtained condensation product, at temperatures not higher than 50–55° C., with a selected azo dyestuff so as to yield a reactive dyestuff within the foregoing formula.

A variation of this preparation process comprised first condensing the condensation product A with a coupling component comprising a portion of selected dyestuff B (and belonging to the benzene or naphthalene series) and then coupling a selected diazo-compound with the thus obtained condensate so as to yield a reactive dyestuff within the foregoing formula.

The optional metallization of the dyestuff may be carried out by known methods such as, for instance, the metallization methods described in U.S. Patents 2,829,139; 3,244,691; and French Patent 1,360,943.

The reactive dyestuffs of the present invention are suitable for dyeing wool, silk, synthetic superpolyamides, but are particularly useful for dyeing fibrous polyhydroxylated materials, such as cellulose, cotton, viscose, etc.

When dyeing cellulose materials with the dyestuffs of the invention, the dye bath contains an acid binding agent such as sodium carbonate, sodium hydroxide or the alkaline phosphates and, optionally electrolytes which promote the exhaustion of the dye bath, such as sodium chloride and sodium sulfate.

The following examples are presented to illustrate the invention without limiting its scope. The parts and percentages set forth therein are by weight, unless otherwise indicated.

EXAMPLE 1

Into 19 parts of cyanuric chloride suspended at a temperature of 5° C. in 130 parts of water and ice, 20.9 parts of the sodium salt of aniline-N-omega-methylsulfonic acid in 100 parts of water were introduced over a period of 15 minutes, while maintaining the temperature at 4–5° C. with 90 parts of ice and the pH between 5 and 6 with a solution consisting of 10 g. of Na$_2$CO$_3$ in 100 cc. H$_2$O. After stirring at 4–5° C. for an additional 4 hours, during which period the pH was always maintained between 5 and 6 with Na₂CO₃ solution, the reaction mixture was filtered to remove the excess cyanuric chloride, thereby obtaining the solution of the monocondensation product (I)

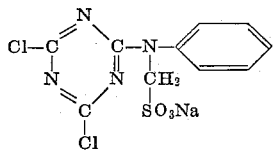

(I)

The solution was poured into a suspension in 50 parts of water of 48.5 parts of the trisodium salt of the diazo prepared by first coupling in acetate medium the diazo of aniline-2,5-disulfonic acid with 3-amino-4-methoxytoluene and then coupling the diazo of the thus obtained monoazo with 1-naphthylamino-6-sulfonic acid.

While maintaining the pH between 6.5 and 7 with a 10% solution of Na₂CO₃ the reaction mixture was heated at 45–50° C. for 24 hours. The dyestuff,

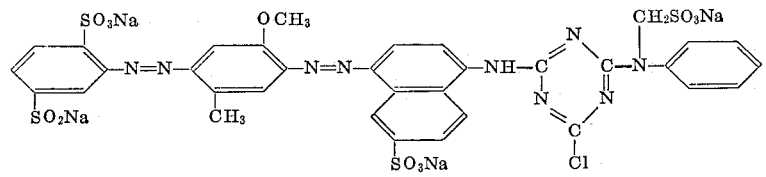

was precipitated by salting out within about 15–20 minutes with a 10% w./v. KCl solution at 25° C., and was then filtered and dried at about 40° C.

The dyestuff dissolved in water, yielding a reddish-brown solution which dyed cotton brown with good fastness after alkaline thermofixing.

EXAMPLE 2

A solution of the monocondensed product (I) obtained as described in Example 1 was poured into a coupling solution obtained by adding, at 0–5° C., 10.8 parts of 3-amino-4-methoxytoluene to a suspension of the diazo of 23.3 parts of 2-naphthylamino-4,8-disulfonic acid and increasing the pH to 4–5 over 1 hour with 11.5 g. of 100% NaOH in form of a diluted solution at about 10% w./v.

While maintaining the pH at about 6.5 with a 10% w./v. solution of Na₂CO₃, the reaction mixture was heated at 40° C. for 8 hours.

The dyestuff,

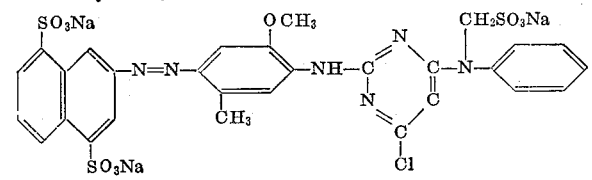

was precipitated by salting out with a 20% w./v. NaCl solution, at pH=6.5, at 18–20° C., and was then filtered and dried at about 40° C.

The dyestuff dissolved in water, yielding a reddish-yellow solution which dyed cotton yellow with good fastness (particularly fast to chlorine) after alkaline thermofixing.

EXAMPLE 3

Into a solution of 25 parts of the sodium salt of the 2-amino-5-naphthol-7-sulfonic acid in 240 parts of H₂O at 30° C., in the presence of 6.5 parts of NaHCO₃ as buffering agent, a solution of the mono-condensed product (I) was added at 4–5° C. The reaction was heated from 20–25° C. to 35° C. over a period of 1 hour and 30 minutes and was then kept at this temperature for 1 hour. During this time the pH increased slowly and spontaneously from 6.5 to 7.5. The diazo of 10.6 parts of the 1-aniline-2-sulfonic acid was poured on the thus obtained discondensed product, cooled to 2° C. while maintaining the coupling pH between 7 and 8 with a 10% solution of Na₂CO₃ and the temperature below 5° C. with ice. The reaction mixture was kept under agitation during the night, while maintaining the temperature between 0 and 5° C. for about 3 hours and then allowing it to rise to 16° C. The next day, the dyestuff,

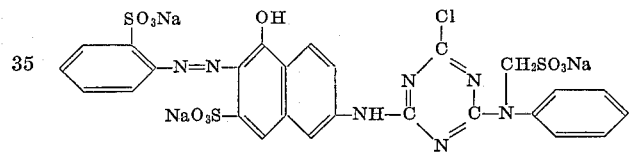

was precipitated at a pH of 6.5 by salting out with NaCl, and was then filtered and dried at about 40° C.

The dyestuff dissolved in water, yielding an orange solution which dyed cotton brilliant yellowish-orange with good fastness (particularly fast to chlorine) after alkaline thermofixing.

EXAMPLE 4

52.8 parts of the disodium salt of the monoazo obtained by alkaline coupling of the diazo of 4-nitro-2-aminophenol with 1-hydroxy-8-aminonaphthalene-3,6-disulfonic acid were dissolved in 600 parts of H₂O together with 12.5 parts of chromium triacetate, containing 22.2% Cr, and this solution was maintained at the boiling point for 5 hours at a pH of 5–6. Into the solution of the 2.1 chromium complex thus obtained, were added 46.5 parts of the sodium salt of the product obtained by precipitating by salting out with 20% NaCl the solution of the monocondensed product (I). The reaction mixture was heated at about 45° C. at a pH of 6.5 until the free amino groups disappeared. Then the dyestuff,

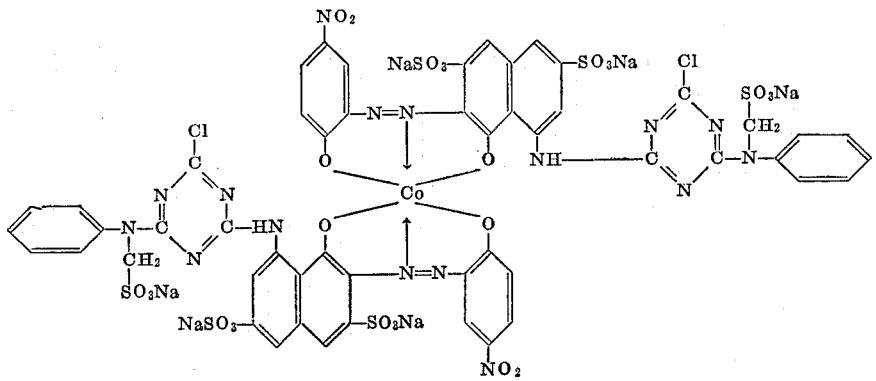

was precipitated at a pH of about 5 by salting out with 20% w./v. KCl solution, at about 20° C., and was then filtered and dried at about 40° C. The dyestuff dissolved in water, yielding an intense bluish solution which dyed cotton dark blue with good fastness (particularly fast to chlorine) after alkaline thermofixing.

EXAMPLE 5

Proceeding as in Example 4, the 2:1 cobalt complex was prepared using cobalt acetate in ammonia solution and then the dyestuff,

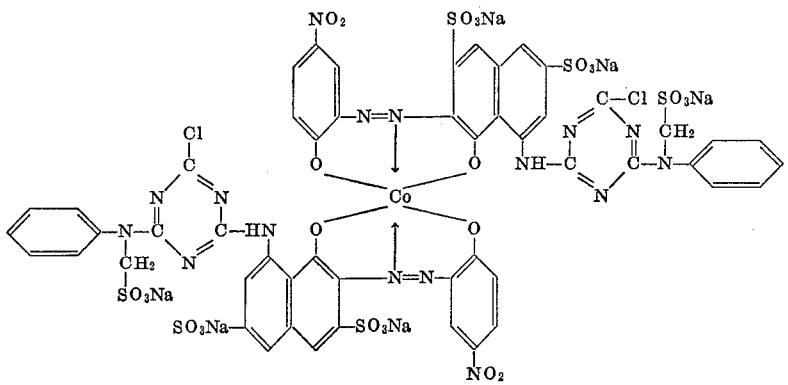

was precipitated at a pH of about 5 by salting out with a 20% w./v. KCl solution at about 20° C., and was then filtered and dried at about 40° C., yielding a dark violet solution which dyed cotton violet. A mixture con- 60° C. by adjusting the pH to 6 and was then filtered, pulped with 450 parts of $H_2O$ at 60° C. and combined with 120 parts of an alkaline solution of the sodium salt of chromosalicylic acid (chromium content 2.6%). The reaction mixture was then heated to the boiling point and maintained at the boiling point for 2 hours. The thus obtained solution was cooled to 25° C. and the pH adjusted to 7. Then 46.5 parts of the sodium salt of the product obtained by precipitating by salting out with 20% NaCl the solution of the monocondensed product (I) (see Example 1) were added. The resulting mixture was heated to 40° C. and maintained at this temperature and a pH of about 6.5 until the free amino groups disappeared. Then, the dyestuff,

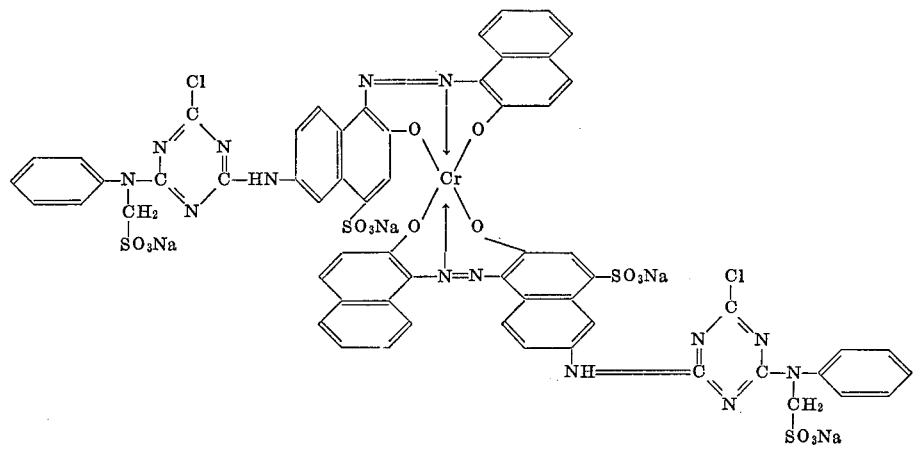

sisting of 1 part of this dyestuff and 7 parts of the dyestuff prepared in Example 4 dyed cotton black. Good fastness (particularly to chlorine) was obtained after alkaline thermofixing.

EXAMPLE 6

43.1 parts of the sodium salt of the monoazo obtained by coupling 6-nitro-1-diazo-2-hydroxynaphthalene-4-sulfonic acid with 2-hydroxynaphthalene were dissolved in 1500 parts of water and heated to 90° C. To this solution were added 43 parts of $Na_2S \cdot 9H_2O$ in 50 parts of water at 60° C. and the reaction mixture was maintained under agitation at 90–95° C. for 1 hour and 30 minutes.

The monoazo amine thus prepared was precipitated at was precipitated at a pH of about 5 by salting out with a 15% w./v. KCl solution, and was then filtered and dried at about 40° C. The dyestuff dissolved in water, yielding a bluish solution which dyed cotton brilliant grey with good fastness after alkaline thermofixing.

EXAMPLE 7

The 2:1 chromium complex prepared from 42.6 parts of the disodium salt of the monoazo obtained by coupling the diazo of 5-nitro-2-aminophenol with 2-amino-5-hydroxynaphthalene-7-sulfonic acid, was condensed (at 40° C. and at a pH of 6.5 until the free amino groups disappeared) with 46.5 parts of the sodium salt of the product obtained by precipitating solution (I) (see Example 1). The dyestuff

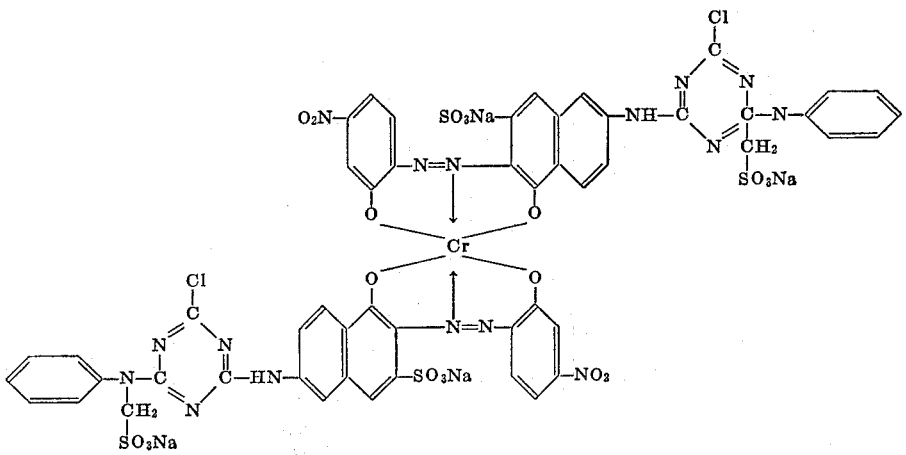

was precipitated at a pH of about 5 by salting out with NaCl, and was then filtered and dried at about 40° C. The dyestuff dissolved in water, yielding a bluish solution which dyed cotton greenish-grey with good fastness after alkaline thermofixing.

EXAMPLE 8

4 parts of anhydrous sodium carbonate and 0.2 part of the dyestuff of Example 1 were dissolved in 200 parts of water. 10 parts of mercerized cotton in the form of a skein were immersed at room temperature in said dye bath and heated under continuous agitation. The heating was regulated so that the temperature rose to 85° C. within 20 minutes. This temperature was maintained for 1 hour. After the heating was begun, 20 parts of anhydrous sodium sulfate were added in three equal portions over a short period of time, preferably within ranges of 5 minutes. Then the dyed material was removed from the dye bath, exhaustively washed in cold water and then with warm water, soaped at the boiling point for 20 minutes in a soaping bath prepared with 2 g./1 of Diapon T. It was then exhaustively rinsed and dried. A skein dyed a brilliant grey shade and having good fastness, particularly to washing, was obtained. The dye bath may be used for successive dyeings, using the same dyestuff, after cooling to 50° C. and addition of 2 parts of sodium carbonate, thus saving sulfate, carbonate and steam.

EXAMPLE 9

2 parts of the metallized dyestuff of Example 4, mixed with 2 parts of $Na_2CO_3$ and 20 parts of urea, were dissolved in 80 parts of $H_2O$. A cotton fabric was impregnated at the foulard with the thus obtained solution and then squeezed until the increase over the initial weight of the fabric was 75–80%. Then the fabric was dried until it contained 15% of residual moisture. The fabric was then subjected to the action of dry heat for 5 minutes at a temperature between 140 and 160° C. rinsed first with cold water and then with hot water, soaped for 15–20 minutes in a 3% solution of Dispersol E. Then the fabric was again rinsed and dried. A fabric dyed a deep bluish shade and having good general fastness, particularly to chlorine, was obtained.

Variations can, of course, be made without departing from the spirit and scope of the invention.

Having thus described our invention, what we desire to secure by Letters Patent and hereby claim is:

1. A reactive dyestuff selected from the group consisting of dyestuffs having the formula

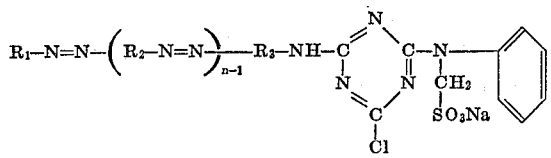

wherein $R_1$, $R_2$ and $R_3$ are each selected from the group consisting of phenyl and naphthyl containing substituents selected from the group consisting of —OH, —$SO_3H$, —$NO_2$, chlorine alkyl containing about 1–3 carbon atoms and alkoxy containing about 1–3 carbon atoms, and $n$ is 1 or 2, said dystuff containing at least three —$SO_3H$ radicals, and cobalt and chromium metal complexes of the foregoing dyestuffs.

2. The reactive dyestuff of claim 1, having the structure:

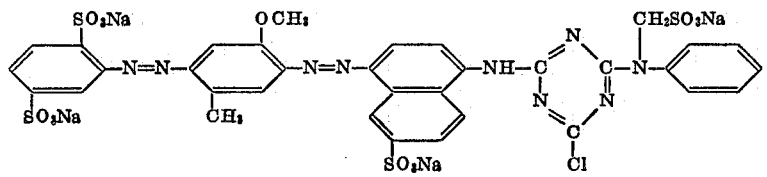

3. The reactive dyestuff of claim 1, having the structure:
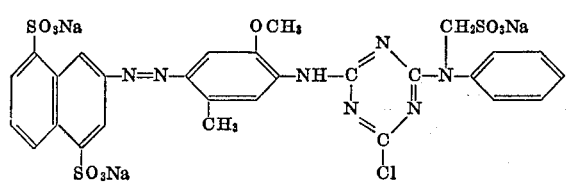
4. The reactive dyestuff of claim 1, having the structure:
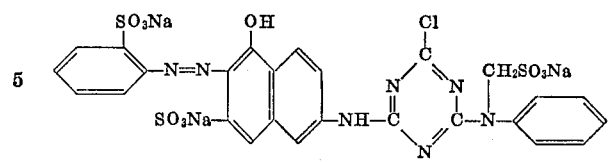
5. The reactive dyestuff of claim 1, having the structure:
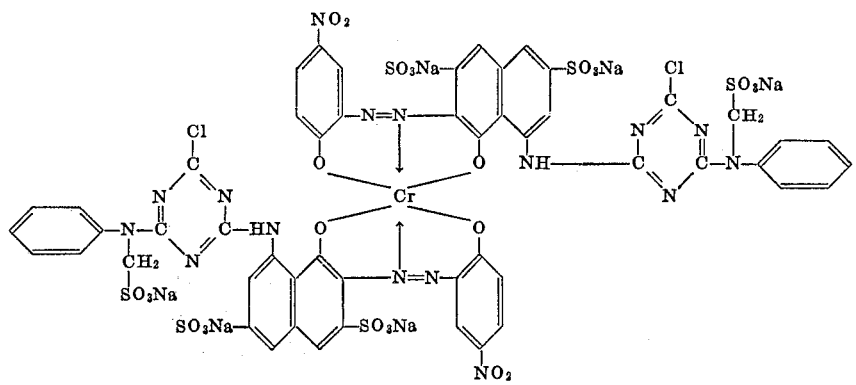
6. The reactive dyestuff of claim 1, having the structure:
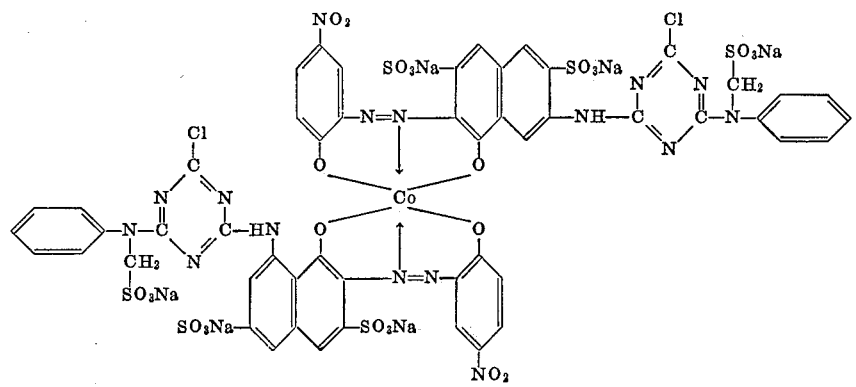
7. The reactive dyestuff of claim 1, having the structure:
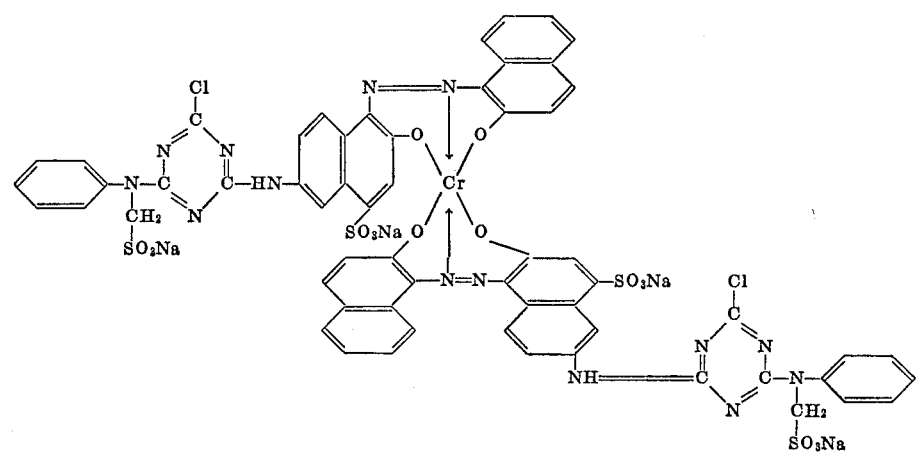

8. The reactive dyestuff of claim 1, having the structure:
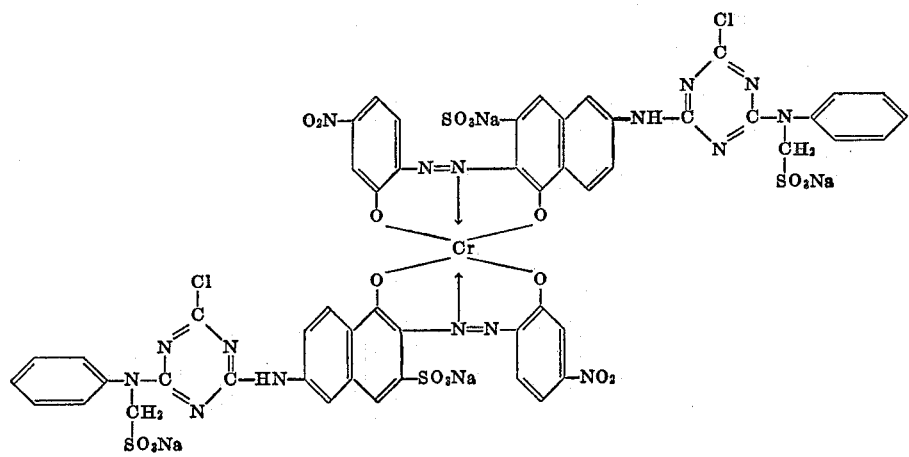
References Cited
FOREIGN PATENTS
1,450,690   7/1966   France.
FLOYD D. HIGEL, Primary Examiner
U.S. Cl. X.R.
8—41, 42, 43, 50; 260—153, 249.5

PO-1050
(5/69)

UNITED STATES PATENT OFFICE
CERTIFICATE OF CORRECTION

Patent No. 3,501,452                    Dated March 17, 1970

Inventor(s) Mario Bertin, Ugo Moiso, and Giulio Craia

It is certified that error appears in the above-identified patent and that said Letters Patent are hereby corrected as shown below:

Column 4, line 10, "reaction was" should read -- reaction mixture was --; line 16, "discondensed" should read -- dicondensed --; structural formula in Example 4, "
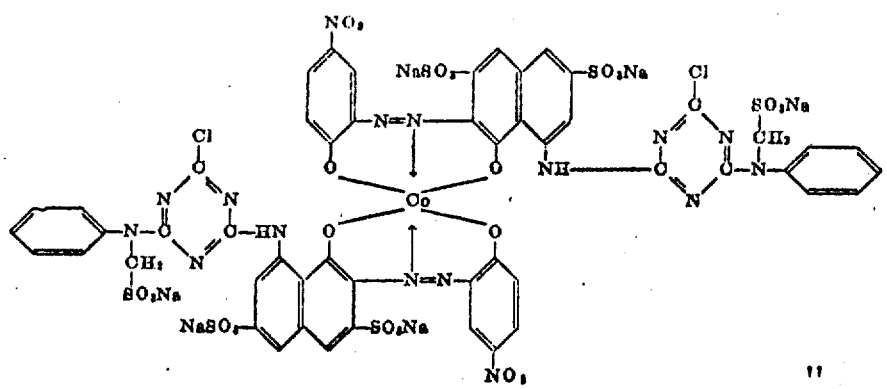
"

should read

--
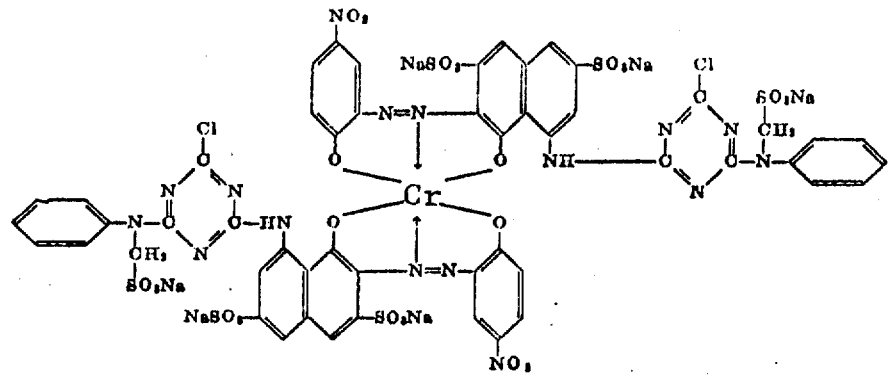
--.

UNITED STATES PATENT OFFICE
CERTIFICATE OF CORRECTION

Patent No. 3,501,452     Dated March 17, 1970

Inventor(s) Mario Bertin, Ugo Moiso, and Giulio Craia

It is certified that error appears in the above-identified patent and that said Letters Patent are hereby corrected as shown below:

Columns 5 and 6, structural formula in Example 6,

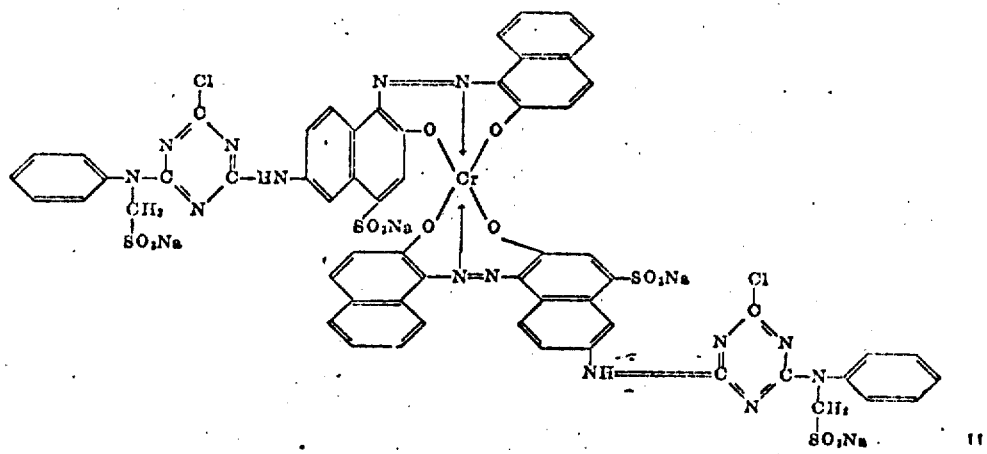

should read

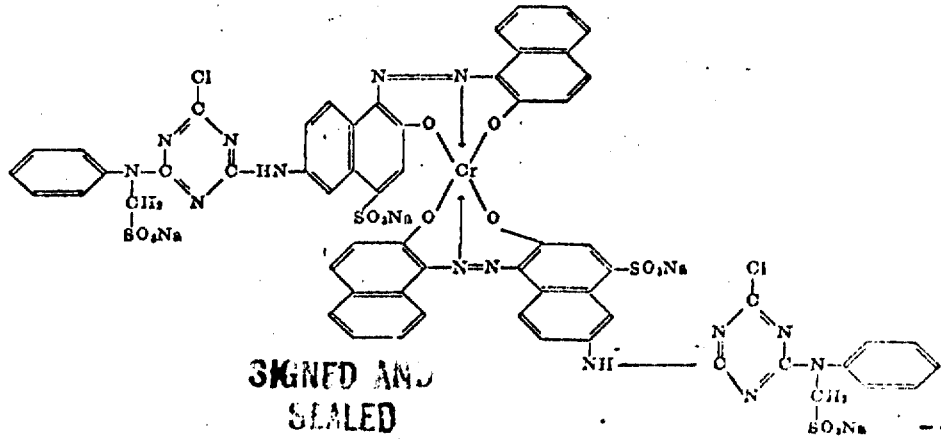

SIGNED AND SEALED
AUG 25 1970

(SEAL)
Attest:

Edward M. Fletcher, Jr.
Attesting Officer

WILLIAM E. SCHUYLER, JR.
Commissioner of Patents